Figure 1:
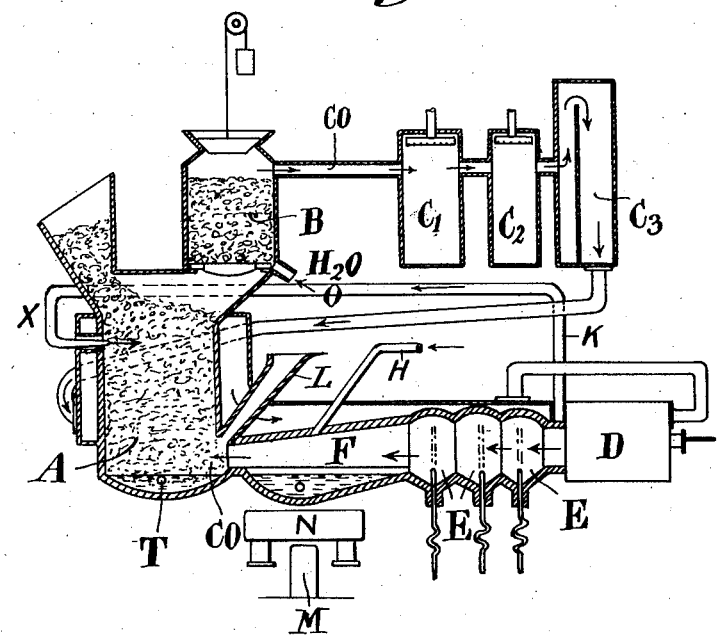

K. A. F. HIORTH.
PROCESS OF PRODUCING IRON AND STEEL DIRECTLY FROM THE ORE.
APPLICATION FILED JUNE 13, 1912.

1,112,007.

Patented Sept. 29, 1914.
2 SHEETS—SHEET 1.

Witnesses:
Minerva Lobel
Carolyn B. Schroeder

Inventor:
Karl A. F. Hiorth

K. A. F. HIORTH.
PROCESS OF PRODUCING IRON AND STEEL DIRECTLY FROM THE ORE.
APPLICATION FILED JUNE 13, 1912.

1,112,007.

Patented Sept. 29, 1914.
2 SHEETS—SHEET 2.

UNITED STATES PATENT OFFICE.

KARL ALBERT FREDRIK HIORTH, OF CHRISTIANIA, NORWAY.

PROCESS OF PRODUCING IRON AND STEEL DIRECTLY FROM THE ORE 1,112,007. Specification of Letters Patent. Patented Sept. 29, 1914.

Application filed June 13, 1912. Serial No. 703,576.

*To all whom it may concern:*

Be it known that I, KARL ALBERT FREDRIK HIORTH, a subject of the King of Norway, residing at Christiania, Norway, have invented certain new and useful Improvements in Processes of Producing Iron and Steel Directly from the Ores; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to the production of iron and steel directly from ores, and it has for its object a process in which there is employed a gaseous reduction agent circulated in the system and supplied with heat by means of an electric arc furnace. The process is characterized more particularly by the fact that the gas which is heated in the electric arc furnace is circulated in such manner as to maintain by direct emission the temperature of the reduced iron and also the temperature of the iron during its finishing treatment, the heat radiated from the furnace preferably being utilized to preheat the circulating gas, while additional heat is introduced into the system at the upper part of the ore charge to thereby effect an economical combined transmission of heat by combustion and the electric arc furnace. If all the heat for melting and reducing the iron is supplied by the electric arc furnace, about one-third horse-power-year is required per ton of iron, but this amount may be reduced by the heat obtained from combustion, although in such an arrangement it is desirable that the ore and coal be separated since coal mixed with ore reduces the $CO_2$. (See Norwegian Patent No. 20,965, filed December 9, 1908). I have found that heating by the electric arc is cheaper for higher temperatures and that the heating by combustion is cheaper at the lower temperatures. Furthermore, I have found that by utilizing the heat from combustion a powerful roasting and loosening effect is obtained, and that by supplying heat to the upper part of the ore charge the possibility of the iron coming into contact with the incandescent nitrogen is avoided to some extent.

There will not in this case be any typical, concentrated zone of heat with the inconveniences of vaults, etc., as in electric furnaces of the Herould type wherein there is employed a low voltage current and carbon electrodes; furthermore the heat together with the current of gas will be uniformly distributed all over, thereby obtaining the most advantageous utilization and effect of the whole plant.

The process will be described more particularly in the following, reference being had to the accompanying drawings in which—

Figure 2:
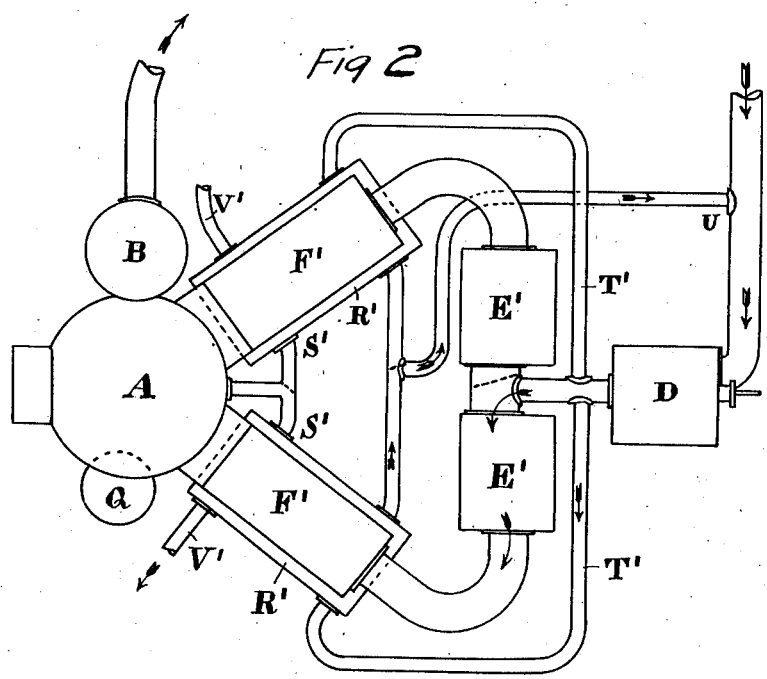

Figure 1 shows diagrammatically the arrangement of the several apparatus in a plant suitable for carrying out the present process; and Fig. 2 illustrates diagrammatically in plan a somewhat modified arrangement of the apparatus.

In the drawings, similar letters of reference indicate corresponding parts wherever used.

In the drawing A is the reducing shaft, B the generator, $C_1$, $C_2$, $C_3$ washing apparatus, D a fan or other blast device, E electric flame-arc furnaces, and F a steel furnace, constructed like a fore-hearth and arranged between the flame-arc furnaces and the shaft-furnace.

The gases employed for the reduction are produced from inferior coal in the generator B (placed as near as possible to A, see Norwegian Patent No. 19953, filed April 3, 1908) preferably according to the Mond system or the like, whereby all substances suitable for fertilizing purposes and other substances are extracted from the gas. The pure gases thus obtained are driven by the fan D through the flame-arc furnaces E, in which they are supplied with the necessary amount of heat, and from thence they are conducted through the steel furnace or the forehearth F arranged just in front of the shaft. In this forehearth, in which the finishing treatment of the iron coming from the shaft is performed wholly or partially, the hot gases pass across the surface of the iron bath thereby supplying the bath with the heat necessary for the steel making treatment. By supplying air at H the temperature above the steel bath may be further raised. From the forehearth the gas enters the shaft A in which it causes the ore to be reduced and the iron to be melted down, the carbon dioxid thereby produced passing from the top of the shaft directly into the generator B in a similar manner as stated in the previously mentioned Norwegian Patent No. 19953. At a suitable point the gas (after having passed through the blower or fan) is led through the pipe K to the upper part of the ore charge, as at X, to supply the additional heat mentioned above, the gas then being burned in the upper part of the charge. To effect the combustion of this gas, air is blown into the charge, together with the gas.

The carbon dioxid conducted to the generator together with aqueous vapor assists in maintaining the temperature produced by the combustion in the generator at a low value so that the least possible amount of the nitrogen of the fuel is lost. The temperature of combustion is kept at the proper value by the carbonic acid which comes from the shaft at approximately the proper temperature. The temperature may also be adjusted by supplying some oxygen, it being possible thereby to obtain reduction gases entirely free of nitrogen.

The shaft A is charged with iron ore (and, if desired, with a small quantity of coal for carburation purposes up to about 1% and for eliminating the action of the carbonic acid that may be carried along with the reduction gases). Otherwise the carburation is suitably effected by blowing a carbon bearing material as carbon powder or crude oil, into the gas in front of the shaft, that is, into the steel furnace F. When so conducting the process as to reduce off almost pure iron, a special small carburation shaft L is preferably provided in front of the ore shaft thereby also obtaining a supply of carbon for carburation purposes and for compensating the action of the carbon dioxid aqueous and the vapor contents of the gas.

All parts of the plant made of brickwork are as far as possible so constructed as to enable them to be exchanged during the operation, and two sets may be provided with the electric flame-arc furnace and the Siemens furnace or the fore-hearth so that by inserting auxiliary gas pipes a continuous pair of said furnaces may be taken into use during the rebuilding of the other pair. Such arrangement is shown in Fig. 2.

In the fore-hearth F, in which the finishing treatment takes place wholly or partially, the supply of heat, as mentioned above, is effected by means of the gases passing from the flame-arc furnaces. During the finishing treatment in the fore-hearth the iron may be drawn from the shaft furnace directly through the tap-hole T into a separate container Q (Fig. 2). The steel, the treatment of which has been finished in the fore-hearth, is tapped into molds M or into an electric furnace N for expelling the gases.

Around the shaft furnace A and the upper portion of the fore-hearth F and the flame-arc furnaces E is arranged a jacket through which pass the gases coming from the washing apparatus, $C_1$, $C_2$, $C_3$ said gases being thereby preheated before being introduced into the furnaces E through the fan D.

In cases where a regeneration of the $CO_2$ leaving the shaft does not take place, the same is blown—as in ordinary Siemens steel furnaces alternately through ordinary regeneration chambers R′ (Fig. 2) arranged in combination with the fore-hearth F.

When the electric furnace E′ and the fore-hearth F′ are in use, hot carbon dioxid gas from the top of the shaft A is led through the regeneration chambers R′. This gas enters the chambers R′ at S′ and leaves at V′, passing therefrom to the chimney. When the filling of the chambers R′ is sufficiently heated, the supply of carbon dioxid gas is stopped and carbon monoxid gas is led from the pipe T′ into the heated chamber from which it passes in heated condition into the gas conduit at U, thus serving to preheat the gas applied to the flame arc furnaces.

The process above described may, of course, be varied in its details within wide limits without departing from the spirit of the invention, and may also for instance be carried out in the following manner.

The ore is according to this modification not reduced completely in the shaft, but the iron flows down into the fore-hearth in a state mixed with some dissolved oxid. The bath in this furnace is then to be treated in the same manner as that usually employed in connection with Siemens furnaces for treating baths which have been reduced and afterward supplied with additional ore or oxidized in other ways. The bath is treated with slag in the ordinary way, carburized to the desired extent and poured either into ingot molds, or, if special quality is aimed at, into a special electric furnace for expelling the gases.

Claims.

1. The process of producing iron and steel directly from an ore charge, which consists in producing a gas rich in carbon oxid, purifying said gas, introducing air and a part of said purified gas into the upper part of the ore charge, electrically heating another part of the purified gas, and passing the electrically heated part of the gas over the metal melted down from the ore charge and into the lower part of the ore charge; substantially as described.

2. The process of producing iron and steel directly from an ore charge made up of ore and a small proportion of carbon material, which consists in producing gas rich in carbon oxid, purifying said gas, introducing air and a part of said purified gas into the upper part of the charge of ore and carbon material, electrically heating another part of the purified gas, and passing the electrically heated part of the gas over the metal melted down from the ore charge and into the lower part of the ore and carbon material; substantially as described.

3. The process of producing iron and steel directly from an ore charge, which consists in producing a gas rich in carbon oxid, purifying said gas, introducing air and a part of said purified gas into the upper part of the ore charge, electrically heating another part of the purified gas, passing the electrically heated part of the gas over the metal melted down from the ore charge and into the lower part of the ore charge, and utilizing the radiated heat to preheat the purified gas; substantially as described.

4. The process of producing iron and steel directly from an ore charge, which consists in producing a gas rich in carbon oxid, purifying said gas, introducing air and a part of said purified gas into the upper part of the ore charge, electrically heating another part of the purified gas, passing the electrically heated part of the gas over the metal melted down from the ore charge and into the lower part of the ore charge, and simultaneously introducing a carbon-bearing material into the lower part of the ore charge; substantially as described.

In testimony that I claim the foregoing as my invention, I have signed my name in presence of two subscribing witnesses.

KARL ALBERT FREDRIK HIORTH.

Witnesses:
 M. GUTTORMSEN,
 N. SCHIANDER.